May 28, 1963　　　　M. S. AYRES　　　　3,091,364
CONTAINER-DISPENSER FOR SALMON EGGS AND THE LIKE
Filed Dec. 9, 1959　　　　　　　　　　　　2 Sheets-Sheet 1

INVENTOR.
MERRILL S. AYRES
BY Shanley & O'Neil
ATTORNEYS

May 28, 1963  M. S. AYRES  3,091,364
CONTAINER-DISPENSER FOR SALMON EGGS AND THE LIKE
Filed Dec. 9, 1959  2 Sheets-Sheet 2
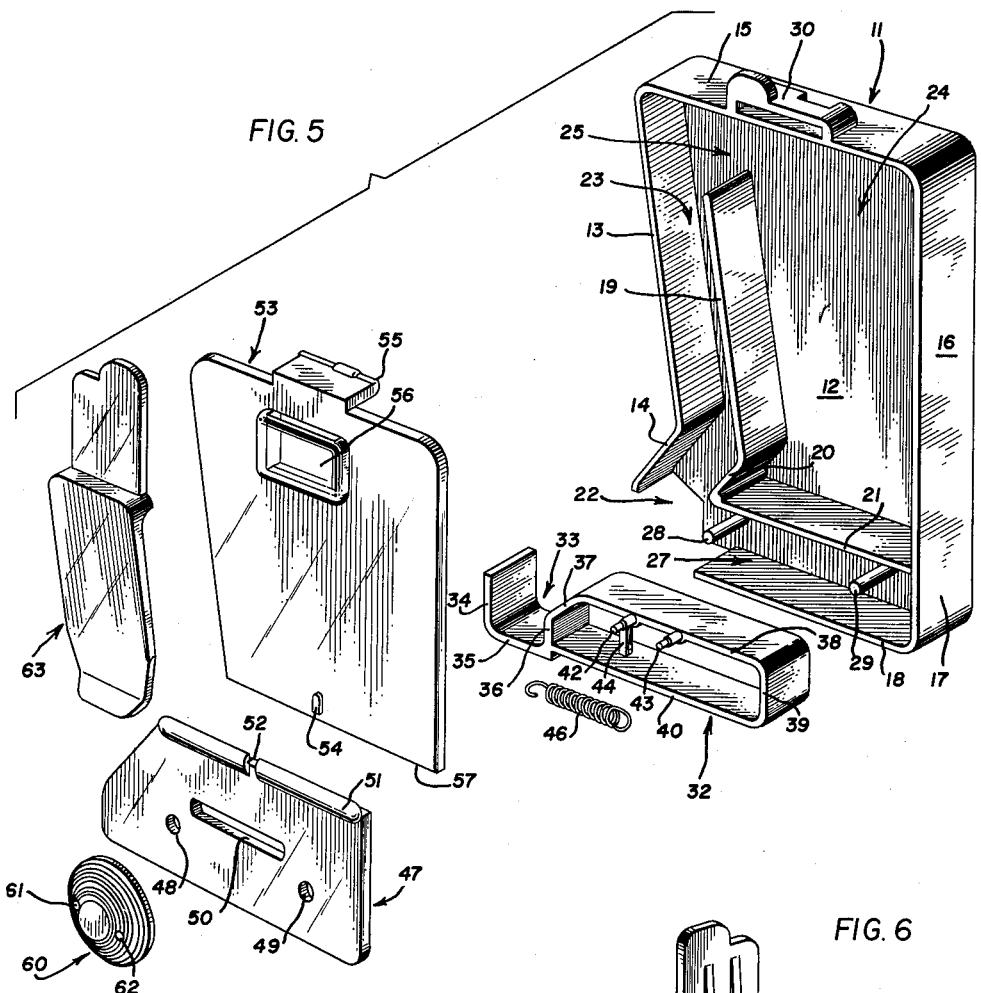
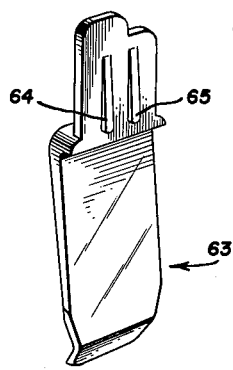
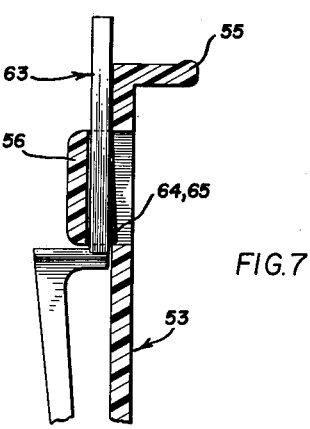
INVENTOR.
MERRILL S. AYRES
BY Shanley & O'Neil
ATTORNEYS

United States Patent Office

3,091,364
Patented May 28, 1963

3,091,364
CONTAINER-DISPENSER FOR SALMON EGGS
AND THE LIKE
Merrill S. Ayres, 4306 Edgemont St., Boise, Idaho
Filed Dec. 9, 1959, Ser. No. 858,389
2 Claims. (Cl. 221—256)

This invention relates to an improved container and dispenser for dispensing resilient articles, such as salmon eggs and the like, one at a time.

The improved container-dispenser is especially suitable for handling salmon eggs and will be described performing this function. When salmon eggs are used as bait, there is an especial need for a dispenser which is readily portable, is easy to load, may be carried in an accessible place about the person, dispenses one salmon egg at a time without damage to the salmon egg being dispensed or the eggs remaining in the container, and is operable with one hand and a minimum of effort to permit the fisherman to have one hand free for handling other fishing equipment.

It is therefore an object of the invention to provide an improved container and dispenser for resilient, pellet-like objects, such as salmon eggs and the like.

A further object is to provide a container and dispenser which dispenses salmon eggs one at a time.

A further object of the invention is to provide a salmon egg dispenser which can be actuated with one hand to dispense a single salmon egg.

A further object of the invention is to provide a salmon egg container and dispenser which is easy to load, carry, and use.

A further object of the invention is to provide an improved salmon egg container and dispenser which is simple and economical to manufacture, assemble and operate.

These and other objects and advantages of the invention will become more apparent during the ensuing description, when taken in conjunction with the accompanying drawings, in which:

FIGURE 5 is an exploded perspective assembly view of the same;

FIGURE 6 is a perspective view of one element of the same; and

FIGURE 7 is a side elevation of a portion of the same, partially in section.

Figure 1:
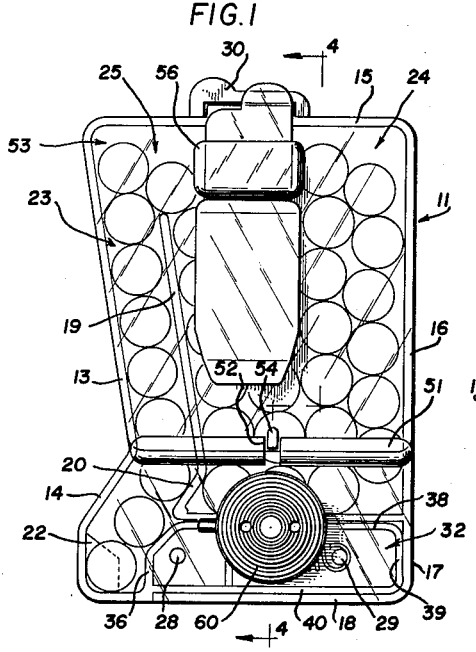
FIGURE 1 is a front elevation of a container-dispenser embodying the invention.
Figure 2:
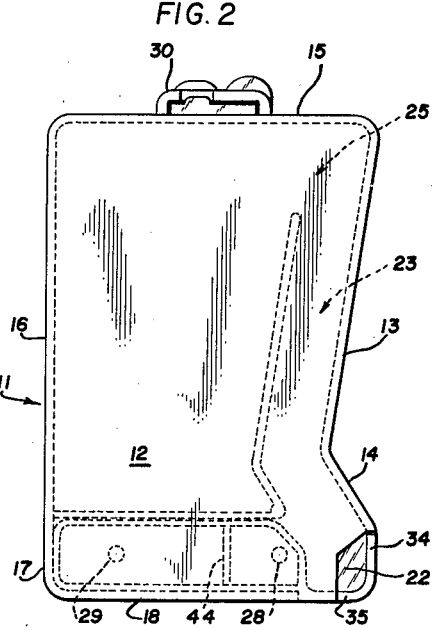
FIGURE 2 is a back elevation of the same.

The container-dispenser of the invention includes a supply chamber adapted to hold a plurality of articles and an actuator means for discharging articles including a dispensing chamber adapted to hold a single article, a guide means between the supply chamber and the dispensing chamber adapted to grip a next succeeding article during discharge of an article from the dispensing chamber.

Referring particularly to FIGURE 5 and collaterally to FIGURES 1 to 4, a main portion of the device is a container designated generally 11. The container 11 is a flat, box-like structure made of opaque plastic. Container 11 has a back wall 12; a side wall made up of two legs 13 and 14, a top wall 15, another side wall made up of upper and lower portions 16 and 17 respectively, and a bottom wall 18. The container 11 is partitioned by partitions 19 and 20 which are substantially parallel to the side wall legs 13 and 14 respectively, and a partition 21 which is substantially parallel to the bottom wall 18. The lower left corner of the container 11 has an opening 22 between the side wall leg 14 and the bottom wall 18.

Partitions 19 and 20 and side wall legs 13 and 14 cooperate to form a collimating chute 23. Partitions 19, 20, and 21, side wall 16, and top wall 15 cooperate to form a salmon egg supply chamber 24. A gateway 25, between the partition 19 and the top wall 15, allows the supply chamber 24 to communicate with the receiving end of the chute 23.

The partition 21, side wall portion 17, and bottom wall 18, cooperate to form a plunger cylinder 27. On the back wall of the plunger cylinder 27 are fixed stanchions 28 and 29. On the top wall 15 is a cover clamping means 30.

A portion of the actuator means, adapted to fit within the plunger cylinder 27, is designated generally 32 and includes a dispensing means, guiding and retaining means, and a plunger means in unitized form. A dispensing chamber 33 has a side wall 34, bottom 35 and another side wall 36. Upper wall 38, side wall 39, and bottom wall 40 form a plunger piston. Two fixed protuberances 42 and 43 are mounted on piston wall 38. A bar 44 extends between the piston walls 38 and 40. Dispenser side wall 36 and piston wall 38 are connected by surface 37, preferably chamfered.

Means 32 is placed in the plunger cylinder 27 so that plunger piston wall 39 contacts the inner surface of container side wall 17. The dispensing chamber 33 is then beneath the chute 23, the dispensing chamber side wall 34 and bottom 35 complete the container side walls at the lower left corner of container 11, and the chamfered surface 37 acts as a guide means for introducing eggs from the supply chamber into the dispensing chamber one at a time. The spring means 46 is fitted with one end over bar 44 and the other end over stanchion 29. In opertaion, means 32 is movable as seen in FIGURES 1 and 3 to the left against the spring pressure until bar 44 reaches stanchion 28, which acts as a stop for the plunger means, and retractable to the right by the spring pressure until the dispensing chamber bottom 35 comes into contact with the container wall 18.

Figure 3:
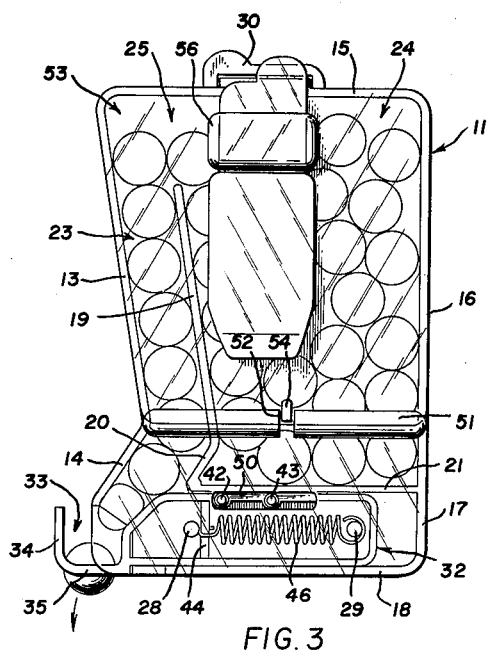
FIGURE 3 is a front elevation of the same in dispensing position.
Figure 4:
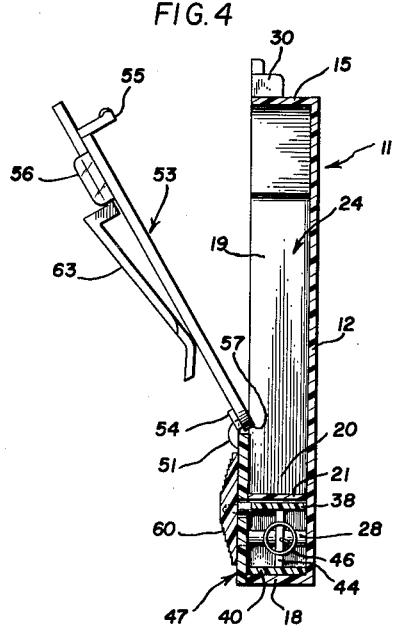
FIGURE 4 is a side elevation of the same, partially disassembled and partially in section.

The entire near side of the container-dispenser as seen in FIGURES 1 and 3 is preferably covered with clear plastic so that the quantity of eggs or the like remaining in the container-dispenser may be visually determined. The cover includes the lower portion 47 having apertures 48 and 49 and an elongated opening 50. Along the top edge of cover portion 47 is a ridge 51 slotted at 52. The lower cover 47 is placed on the container 11 so that apertures 48 and 49 fit over the fixed stanchions 28 and 29, which hold the lower portion 47 of the cover securely in place. The fixed protuberances 42 and 43 on the plunger means 32 protrude through the elongated opening 50.

The cover also includes an upper portion 53 having a fixed node 54, an edge latch 55, and a sleeve 56. The upper cover 53 is placed over the container 11 so that its lower edge 57 fits under the ridge 51 and the fixed node 54 fits into the slot 52. The edge latch 55 is then aligned with cover clamping means 30 and cover portion 53 may be snapped into place.

With the cover portions 47 and 53 in place on the container 11, the small protuberances 42 and 43 protrude through the cover portion 47 at the elongated opening 50. A plunger actuator knob 60 having apertures 61 and 62 is fitted over the protuberances 42 and 43 locking the knob 60 to the plunger means 32.

Referring to FIGURES 6 and 7, a fastening clip 63, having retaining catches 64 and 65, is inserted into the sleeve 56 of upper cover 53 and is held in place by the retaining catches 64 and 65. By means of the fastening clip 63 the container-dispenser may be readily attached to the shirt pocket or belt of the user, or hung at any suitable location about the user.

The assembled container-dispenser is shown in FIGURE 1. The supply chamber 24 is filled, in a random fashion, with salmon eggs. The salmon eggs passing through the gateway 25 are collimated by the chute 23. At the delivery end of the chute 23, the dispensing chamber 33 holds one salmon egg.

Referring to FIGURE 3, wherein the knob 60 has been removed in the interest of clarity, when a salmon egg is to be discharged the actuator means including the knob 60 and means 32 is moved to the left as shown. The dispenser side wall 36 moves one egg into discharge position and the surface 37 grips the next succeeding salmon egg and resiliently holds that egg in contact with the container side wall 14, thereby retaining the remaining eggs during discharge of one egg. When the single egg in the dispensing chamber 33 has been discharged, and the knob 60 is released, the actuator means 32 will return to its seated position and the succeeding salmon egg will drop into the dispensing chamber 33. Repeating the reciprocal motion of the actuator will cause a repetition of the cycle, reloading the dispensing chamber and discharging one egg at a time from the dispensing chamber while gripping the next succeeding egg.

As described above, when discharging an article from the container, the surface 37 moves into gripping relationship with the next succeeding article. The article is compressed between wall portion 37 and the container side wall 14. The surface 37 which can act as a guide means for introducing the articles one at a time to the dispensing chamber also resiliently holds the next succeeding article during discharge of the article from the dispensing chamber. Dependent on the quantity of movement required to discharge an article and especially when handling fragile articles, there is considerable advantage in making surface 37 a chambered surface. In this way, the full motion of the actuator means is imparted to the article to be discharged while only a portion of the motion is converted into a gripping force.

While a specific embodiment has been shown and described, it is to be understood that various changes in the shape or size of the parts and the materials employed may be resorted to without departing from the spirit of the invention or the scope of the subjoined claims.

What is claimed is:
1. A combination salmon egg container and dispenser comprising
   a supply chamber for a plurality of salmon eggs,
   dispensing means including a dispensing chamber for receiving one salmon egg at a time,
   plunger means joined to the dispensing chamber including a chamfered surface adjacent to the dispensing means,
   guide means including a collimating chute extending between the chamfered surface and the supply chamber to direct salmon eggs to the dispensing chamber, and
   means for simultaneously moving the dispensing chamber to the exterior of the container and the chamfered surface to compressively hold a salmon egg about to be delivered to the dispensing chamber and discharge a previously delivered salmon egg through the dispensing chamber.
2. A combination salmon egg container and dispenser comprising
   a salmon egg container including side walls and partitions which divide the container into a salmon egg supply chamber, a salmon egg collimating chute, and a plunger cylinder,
   plunger means positioned within the plunger cylinder, the plunger means including a single egg dispensing chamber arranged to receive salmon eggs one at a time from the collimating chute, a chamfered surface adjacent to the dispensing chamber which coacts with an opposed side wall of the container to compress a salmon egg about to be delivered to the dispensing chamber and retain salmon eggs thereabove in the collimating chute when the dispensing chamber is in discharge position, and
   plunger activator means for imparting reciprocal motion to the plunger means to discharge one salmon egg at a time through the dispensing chamber.

References Cited in the file of this patent
UNITED STATES PATENTS

| | | |
|---|---|---|
| 1,086,720 | Knudsen | Feb. 10, 1914 |
| 1,676,109 | Oldenbusch | July 3, 1928 |
| 1,684,747 | Stimpson | Sept. 18, 1928 |
| 2,348,449 | Chandler | May 9, 1944 |

FOREIGN PATENTS

| | | |
|---|---|---|
| 467,898 | Italy | Dec. 24, 1951 |